US008050143B2

(12) United States Patent
Bufi et al.

(10) Patent No.: US 8,050,143 B2
(45) Date of Patent: Nov. 1, 2011

(54) SYSTEM AND METHOD FOR GENERATING A THREAT ALERT

(75) Inventors: Corey Nicholas Bufi, Troy, NY (US); Sahika Genc, Troy, NY (US)

(73) Assignee: General Electric Company, Niskayuna, NY (US)

( * ) Notice: Subject to any disclaimer, the term of this patent is extended or adjusted under 35 U.S.C. 154(b) by 559 days.

(21) Appl. No.: 12/054,510

(22) Filed: Mar. 25, 2008

(65) Prior Publication Data

US 2009/0245026 A1 Oct. 1, 2009

(51) Int. Cl.
*H04B 1/10* (2006.01)

(52) U.S. Cl. ........................................................ 367/136

(58) Field of Classification Search .................. 367/136; 702/18; 340/686.1, 533, 500, 539.1, 566
See application file for complete search history.

(56) References Cited

U.S. PATENT DOCUMENTS 5,416,724 A * 5/1995 Savic .............................. 702/51
6,281,792 B1 * 8/2001 Lerg et al. ..................... 340/540
6,421,354 B1 * 7/2002 Godlewski .................... 702/127
6,552,963 B2 * 4/2003 Baranek et al. ............... 367/136
6,785,618 B2 * 8/2004 Kechter et al. .................. 702/39
7,607,351 B2 * 10/2009 Allison et al. .................. 73/592
2004/0210757 A1 10/2004 Kogan et al.
2005/0088915 A1 * 4/2005 Lapin et al. ................... 367/118
2005/0251343 A1 * 11/2005 Zehavi ............................ 702/18
2006/0068754 A1 * 3/2006 Goldfarb et al. .............. 455/410
2006/0225507 A1 * 10/2006 Paulson .......................... 73/592
2007/0278008 A1 * 12/2007 Kuckes et al. .................. 175/40
2009/0000381 A1 * 1/2009 Allison et al. .................. 73/596
2009/0245026 A1 * 10/2009 Bufi et al. ..................... 367/135
2010/0013627 A1 * 1/2010 Bufi et al. ..................... 340/533

FOREIGN PATENT DOCUMENTS

JP 2003004519 A * 1/2003

OTHER PUBLICATIONS

Yuh-Horng Wen, Tsu-Tian Lee, Hsun-Jung Cho; "Hybrid Models toward Traffic Detector Data Treatment and Data Fusion"; Networking, Sensing and Control, 2005. Proceedings. 2005 IEEE; pp. 525-530.

* cited by examiner

*Primary Examiner* — Daniel Pihulic
(74) *Attorney, Agent, or Firm* — Ann M. Agosti

(57) ABSTRACT

A system for generating a threat alert in an infrastructure component is provided. The system includes multiple acoustic sensors configured to detect a signal. The system also includes a processing circuitry including at least one analog-to-digital converter configured to digitize the signal. The processing circuitry also includes a digital signal processor configured to process the acoustic signal in a sequential routine. The sequential routine includes a noise filtering routine configured to filter background noise from the acoustic signal and generate a filtered signal. The sequential routine also includes a source identification routine configured to identify a source generating the acoustic signal based upon the filtered signal. The sequential routine further includes a threat analysis routine configured to detect a threat based upon the source identified and generate a threat level signal.

10 Claims, 5 Drawing Sheets

SYSTEM AND METHOD FOR GENERATING A THREAT ALERT

BACKGROUND

The present invention relates generally to a method and system for securing an infrastructure component such as a pipeline. More particularly, the present invention relates to a method and system for implementing sensor arrangements and gathering data to protect the infrastructure component against potential threats.

In recent years, considerable efforts have been made to secure components of infrastructure such as pipelines and associated oil and gas infrastructure, with financial support from both industry and government. Other examples of infrastructure components include rail lines, waterways, electrical distribution networks, water distribution networks, and so forth. Securing infrastructure components against intentional destructive attacks has been an important focus. However, certain infrastructure components also face threats from third party accidental excavation damages, for example, damage from backhoes or from farmers plowing fields with large machinery, or other machinery used in construction or excavation activities. Providing protection for infrastructures is a complicated task because many components are extremely large and easily accessible.

Traditionally, responses to threats against such infrastructure components have been mostly reactive, mainly because of the enormous amount of resources required to safeguard such infrastructure sites. Ground and aerial patrols have been used, but such patrols have limitations of timely preparedness for responding to a threat effectively. In-person patrolling is not a cost-effective solution, especially where continuous monitoring is considered desirable. Additionally, daily patrolling of pipeline resources has been estimated to be relatively ineffective in terms of actual damage prevention.

Some recent developments in automated pipeline security include the use of geophones, fiber optic cables, satellite surveillance and the like. These solutions have several limitations. One problem is that such sensing methods require highly skilled professionals and sophisticated equipment to deploy them, which limits the level of responsiveness concerned authorities can be to changing threat situations. Furthermore, the sensitivity or range of detection of such devices is highly dependent on the medium in which they are embedded. For example, fiber optic cables used for protecting pipelines must be installed below ground where signals from above ground threats are attenuated due to the air-soil impedance mismatch. In general, geophones and fiber optic cables need to be physically mounted to the monitored infrastructure, a process that tends to incur great costs and that poses great risk of damaging the monitored infrastructure. Satellite surveillance is expensive and is not feasible as a sole method for real time threat detection.

Therefore, there is a need for an improved system and method for detecting threats for components of large infrastructures such as pipelines.

BRIEF DESCRIPTION

In accordance with one aspect of the invention, a system for generating a threat alert in an infrastructure component is provided. The system includes a multiple acoustic sensors disposed in a protected zone around the infrastructure component, wherein each of the sensors is configured to detect a signal corresponding to an outcome that causes damage to the infrastructure component. The system also includes a processing circuitry coupled to each of the multiple acoustic sensors. The processing circuitry includes at least one analog-to-digital converter configured to digitize the signal. The processing circuitry also includes a digital signal processor configured to process the acoustic signal in a sequential routine. The sequential routine includes a noise filtering routine configured to filter background noise from the acoustic signal and generate a filtered signal. The sequential routine also includes a source identification routine configured to identify a source generating the acoustic signal based upon the filtered signal. The sequential routine further includes a threat analysis routine configured to detect a threat based upon the source identified and generate a threat level signal. The system also includes a remote monitoring center that receives the threat level signal from the processing circuitry and transmits an alert message to a concerned authority.

In accordance with another aspect of the invention, a digital signal processing sequential routine for generating threat alert in an infrastructure component is provided. The digital signal processing sequential routine includes a noise filtering routine configured to filter background noise from an acoustic signal detected by an acoustic sensor and generate a filtered signal. The digital signal processing sequential routine also includes a source identification routine configured to identify a source generating the acoustic signal based upon the filtered signal. The digital signal processing sequential routine further includes a threat analysis routine configured to detect a threat and generate a threat level signal based upon the source identified.

In accordance with another aspect of the invention, a method for generating a threat alert in an infrastructure component is provided. The method includes detecting an acoustic signal corresponding to an outcome that causes damage to the infrastructure component. The method also includes digitizing the acoustic signal. The method further includes processing the digitized acoustic signal via a plurality of sequential steps, wherein the sequential steps include filtering background noise in the acoustic signal. The sequential steps also include identifying a source generating the acoustic signal based upon the filtering of the background noise. The sequential steps further include performing a threat analysis based upon identification of the source. The sequential steps also include generating a threat level signal based upon the threat analysis. The method further includes transmitting the threat level signal to a concerned authority via a communication link.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention include a system and method for generating a threat alert. As used herein, the system and method are employed to identify a source of threat in order to distinguish excavators such as, but not limited to, backhoes from other types of vehicles and further generate a threat alert to prevent resulting excavation damages.

Figure 1:
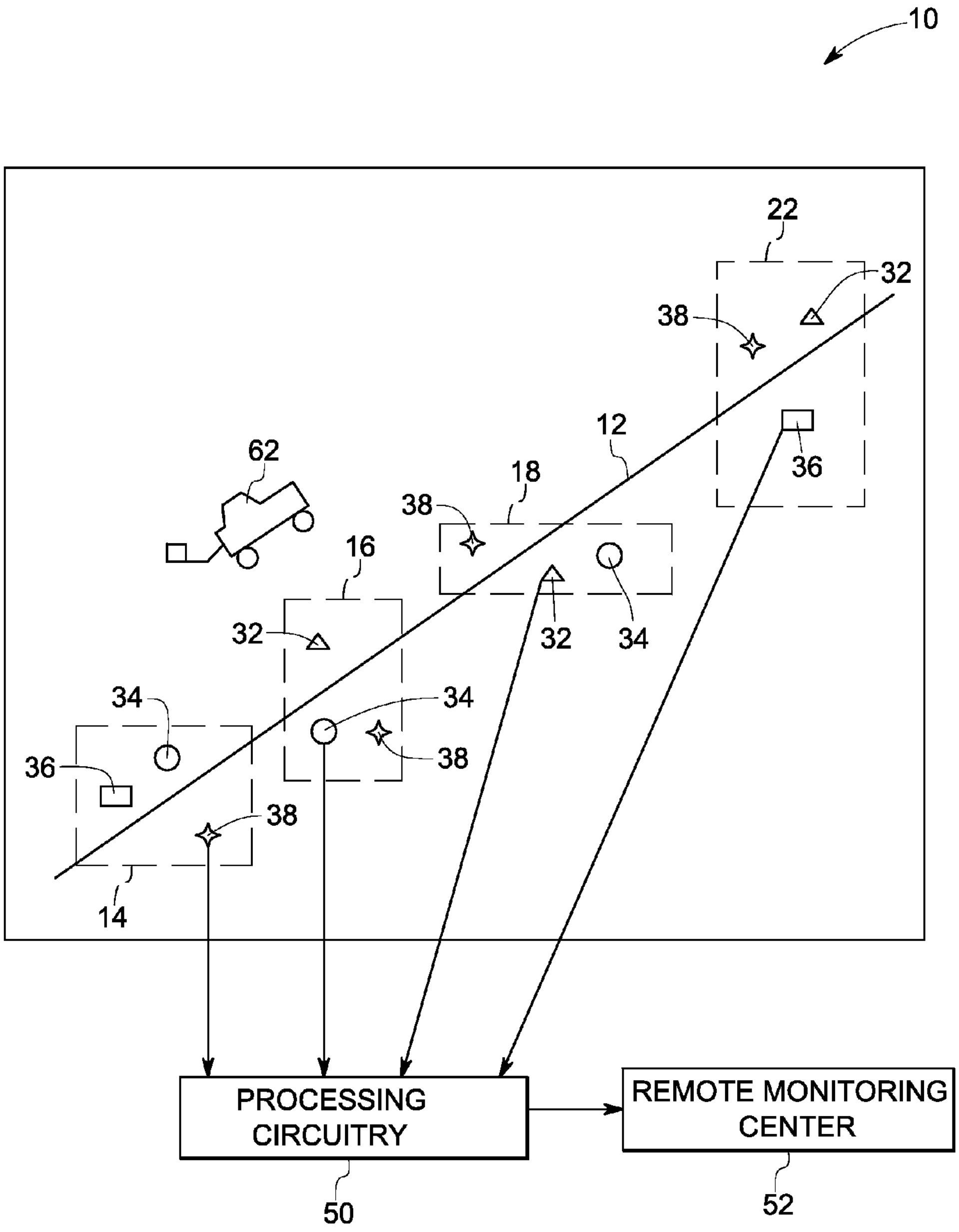
FIG. 1 is a schematic illustration of a security monitoring system for a pipeline infrastructure according to one embodiment of the invention.

Turning to the drawings, FIG. 1 illustrates a security monitoring system 10 for an infrastructure component that includes, for example, a pipeline 12 that extends for several miles. The region around the pipeline 12 that needs protection can be divided into distinct protected zones, as illustrated by reference numerals 14, 16, 18 and 22. It will be appreciated that although the pipeline 12 has been illustrated to be linear, it can possess a variety of shapes such as, for example, a circular shape. The choice of these protected zones 14, 16, 18 and 22 depends on design considerations such as a choice of communication network, or the actual geography of the landscape where the infrastructure component to be protected is located.

An exemplary combination of sensors dispersed around these protected zones 14, 16, 18 and 22 may include a plurality of acoustic sensors 32, 34, 36 and 38, single or multiple instances of which are chosen to detect a threat activity even prior to actual threat or damage to the infrastructure component. Each of the sensors 32, 34, 36 and 38 is configured to detect a threat behavior of a typical threat causing agency 40 corresponding to an outcome that causes damage to the infrastructure component and send a signal representing the threat behavior. In one embodiment, the sensors 32, 34, 36 and 38 are installed above ground level without need for excavation.

The sensors 32, 34, 36, 38 may form a network for wirelessly communicating with each other. In another embodiment of the invention, the sensors 32, 34, 36, 38 may communicate wirelessly with each other in a pre-defined fashion. In yet another embodiment of the invention, the output of several types of sensors may be combined and/or several sensors may be arranged such that the output of one is input to another. In yet another embodiment of the invention, typical sensor packages may use additional information, with probabilistic logic, to determine one or more attributes about the corresponding protected zone that may indicate a threat level. Moreover, the installations of the multiple types of sensors 32, 34, 36, 38 may be permanent in one embodiment of the invention such that these, once installed, remain in the high probability area. In another embodiment of the invention, for instance, at a construction site the installations of the sensors 32, 34, 36, 38 may be temporary. A processing circuitry 50 is configured to receive, process and coordinate sensing signals from various types of sensors 32, 34, 36 and 38. Additionally, the processing circuitry 50 may transmit this data to a remote monitoring center 52 via a communication link that further analyzes the information and generates alerts. Some examples of the communication link include wireless networks, hardwire computer data link, a cellular link, satellite communication and wireless sensor-to-sensor communication.

Figure 2:
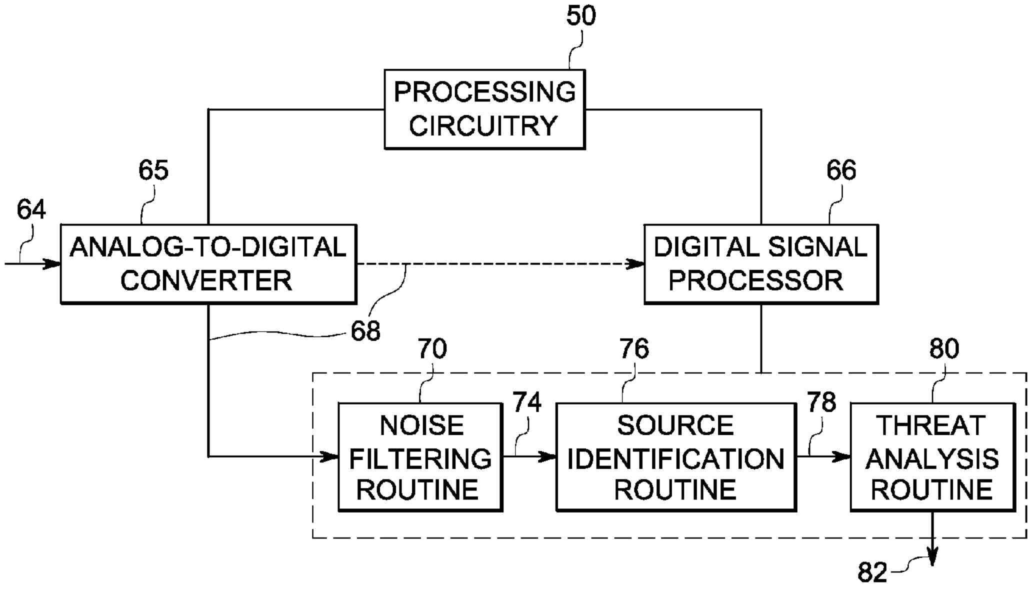
FIG. 2 is a block diagram representation of a processing circuitry including sequential routines according to one embodiment of the invention.

FIG. 2 is a block diagram representation of the processing circuitry 50 in FIG. 1 that includes at least one analog-to-digital (ADC) converter 62 to digitize sensing signals 64. A digital signal processor (DSP) 66 receives digitized signals 68 and processes the signals 68 in a sequential routine 70. A noise filtering routine 72 filters background noise from the signals 68 and outputs a filtered signal 74 to a source identification routine 76. The source identification routine 76 identifies a source generating the signal 74 and outputs a resulting information signal 78 to a threat analysis routine 80, which detects a threat based upon a source identified in the source identification routine 76. The threat analysis routine 80 further generates an alarm, if necessary. Information signal 82 from the threat analysis routine 80 is further transmitted to the remote monitoring center 52, as referenced in FIG. 1.

Figure 3:
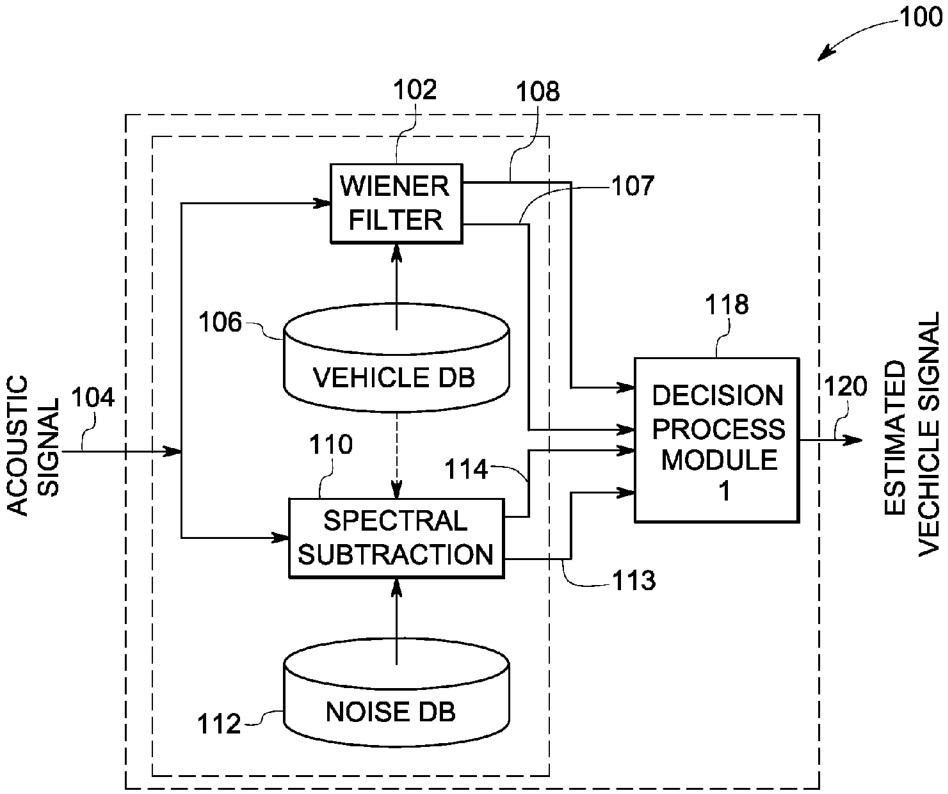
FIG. 3 is a block diagram representation of an exemplary noise filtering routine according to one embodiment of the invention.

FIG. 3 is a block diagram representation of an exemplary noise filtering routine 100. The noise filtering routine 100 distinguishes acoustic signals produced by a vehicle entering a protected zone from normal background noise of surrounding environment. Two filtering paths are employed to leverage strengths of each filter against shortcomings of the other. In the illustrated embodiment, a first filtering path is a Weiner filter 102. An acoustic signal 104 from the sensors (FIG. 1) is input into the Wiener filter 102. The Weiner filter 102 includes a vehicle database 106 having a database of acoustic signals typically produced by different vehicles. Different vehicles have different acoustic signal representations. For example, heavy wheel vehicles such as trucks produce a larger acoustic signal compared to an economy car. In order to account for various representations of the vehicle, a bank of Weiner filters may be employed, wherein each Weiner filter considers a particular vehicle representation as a desired signal. Non-limiting examples of the vehicles include backhoes, bulldozers, trucks, cars and aeroplanes. The acoustic signal 104 is compared to the vehicle database 106 to filter out noise present in the acoustic signal 104. A resulting signal 107 is a filtered acoustic signal indicating presence or absence of a vehicle. Presence of a vehicle results in zero error 108 indicative of matching of the acoustic signal 104 with one of the acoustic signals in the vehicle database 106, while absence of the vehicle results in a non-zero error 108. A perfect match with a representation in the vehicle database 106 is unlikely, since the acoustic signal 104 is a frequency spectrum that is a waveform-like data point and the error 108 is included as a measure of closeness of the acoustic signal 104 of the vehicle to an actual acoustic signature of the vehicle.

A second filtering path is a spectral subtractor 110 that compares the acoustic signal 104 with a noise database 112 and subtracts the noise from the acoustic signal 104. The noise database 112 includes a database of acoustic signals corresponding to sounds produced by surrounding environment such as, but not limited to, heavy traffic, light traffic, and intersection traffic. The spectral subtractor 110 estimates background noise during periods where no target vehicle is present, and subtracts the estimated background noise from the acoustic signal 104 that may or may not contain a target vehicle. The subtracted signal is output as resulting signal 113. If the target vehicle were not present, then a resulting error signal 114 would be close to zero since the acoustic signal 104 would be mostly noise. If the target vehicle is present, then the resulting error signal 114 is that of an acoustic signal corresponding to the target vehicle, since the noise would be subtracted. The resulting signals 107, 113 and the error signals 108, 114 are input into a decision process module 118 that combines the signals and produces a combined estimate 120 of the vehicle signal. The combined estimate

120 for which a combined error is within an acceptable range is passed further into the source identification routine 76, as referenced in FIG. 2.

Figure 4:
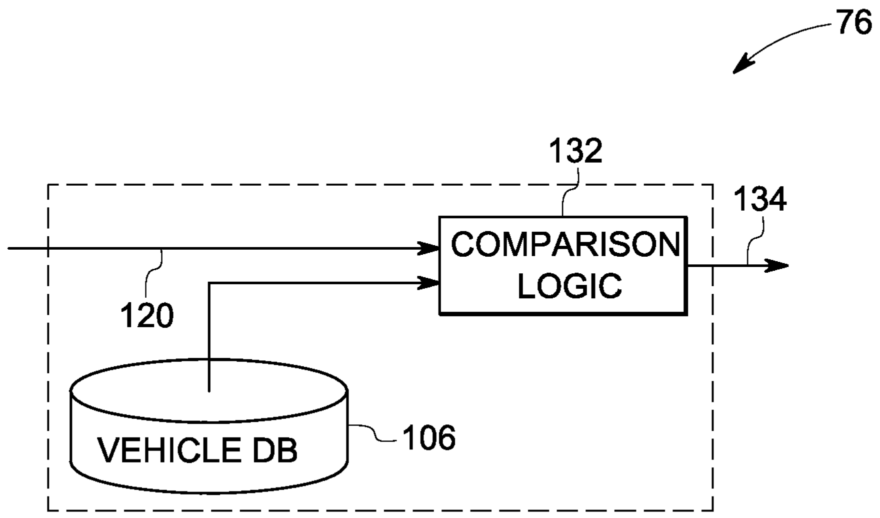
FIG. 4 is a block diagram representation of a source identification routine according to one embodiment of the invention.

FIG. 4 is a block diagram representation of the source identification routine 76 (FIG. 2). The combined estimated signal 120 from the noise filtering routine 100 (FIG. 3) is input into a comparison logic circuitry 132 that compares the signal 120 with a vehicle database 106, as referenced in FIG. 3. The comparison logic circuitry 132 outputs a resulting signal 134 that distinguishes excavators such as backhoes from other vehicles such as, but not limited to, dump trucks and pickup trucks. The resulting signal 134 thus enables distinguishing vehicles that pose a threat from those that do not. In an exemplary embodiment, the resulting signal 134 is a string of identification symbols and may output a symbol 'B' to represent a backhoe, 'O' for other vehicles and 'N' if no vehicle is present.

Figure 5:
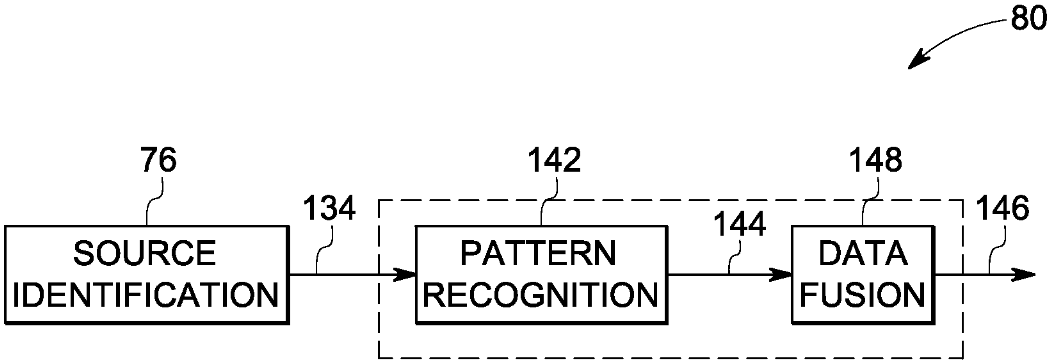
FIG. 5 is a block diagram representation of a threat analysis routine according to one embodiment of the invention.

FIG. 5 is a block diagram representation of the threat analysis routine 80 in FIG. 2. The threat analysis routine 80 includes a pattern recognition module 142 that receives a sequence of identification symbols via the resulting signal 134 from the source identification routine 76 (FIG. 4). The sequence of symbols 144 is further aggregated into a final threat level signal 146 that is transmitted to a remote monitoring center 52 (FIG. 1). Optionally, the sequence 144 is input into a data fusion module 148, wherein the data is shared between different sensors 32, 34, 36, 38 (FIG. 1) in a protected zone. The sharing of data enables a forewarning to following protected zones in case of a potential threat.

Figure 6:
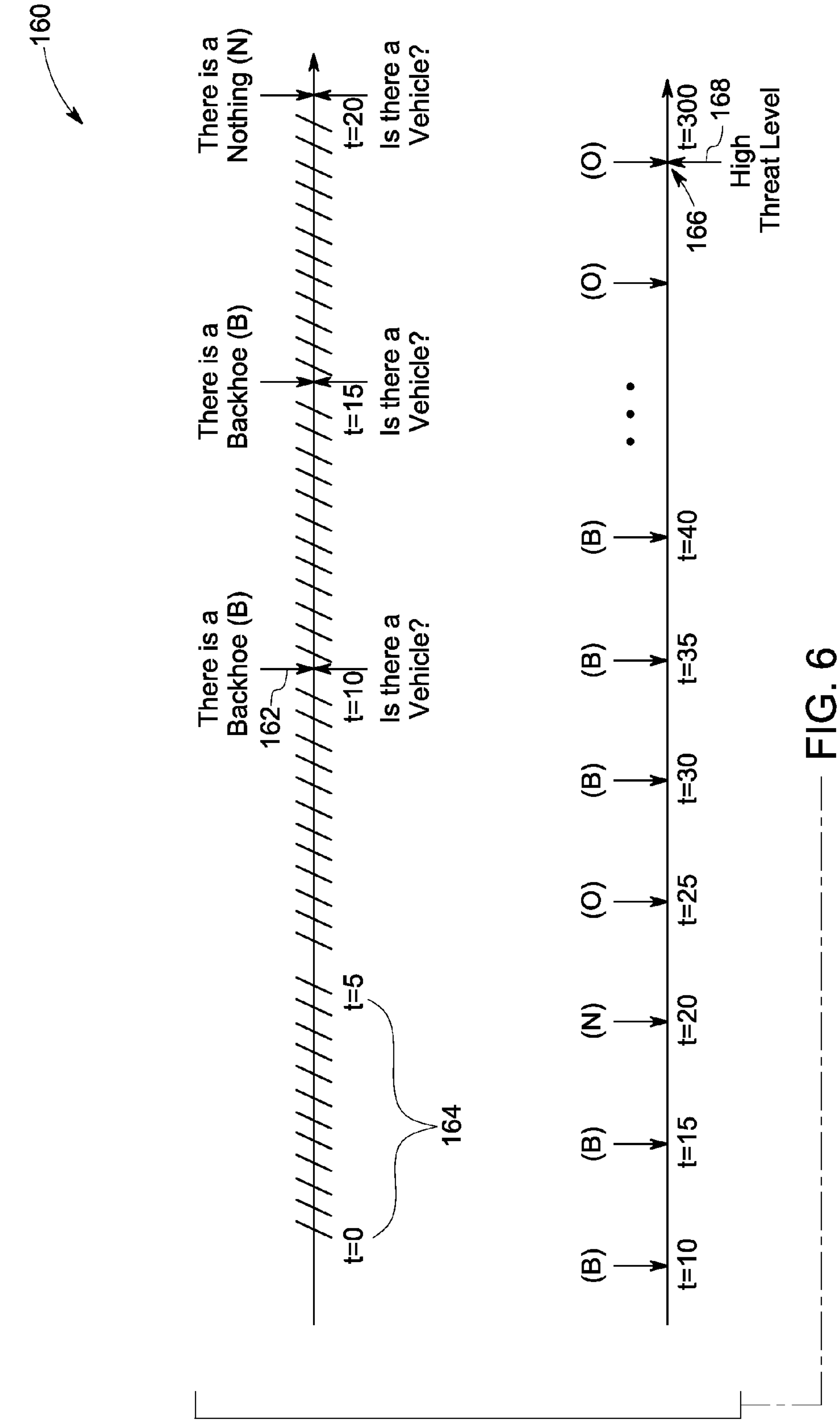
FIG. 6 is a schematic illustration of an exemplary threat analysis process in the threat analysis routine.

FIG. 6 is a schematic illustration of an exemplary threat analysis process 160 in the threat analysis routine 80. The source identification routine 76 produces identification symbols 162 every 5 seconds at t=0, 5, 10, . . . etc. referenced by numeral 164. The threat analysis routine 80 analyzes the symbols 162 after a period of 5 minutes, say, t=300 seconds, as referenced by numeral 166 and accordingly, produces a threat level signal 168. There are various pattern recognition rules that are employed. In a particular embodiment, a threat level signal is generated if a percentage of consecutive B's, representing backhoes, is greater than about 50% within a minute. In another embodiment, an equal number of B's and O's (other vehicles) is considered a medium threat level. In yet another embodiment, a number of consecutive B's within a time period is considered a measure for the threat signal.

Figure 7:
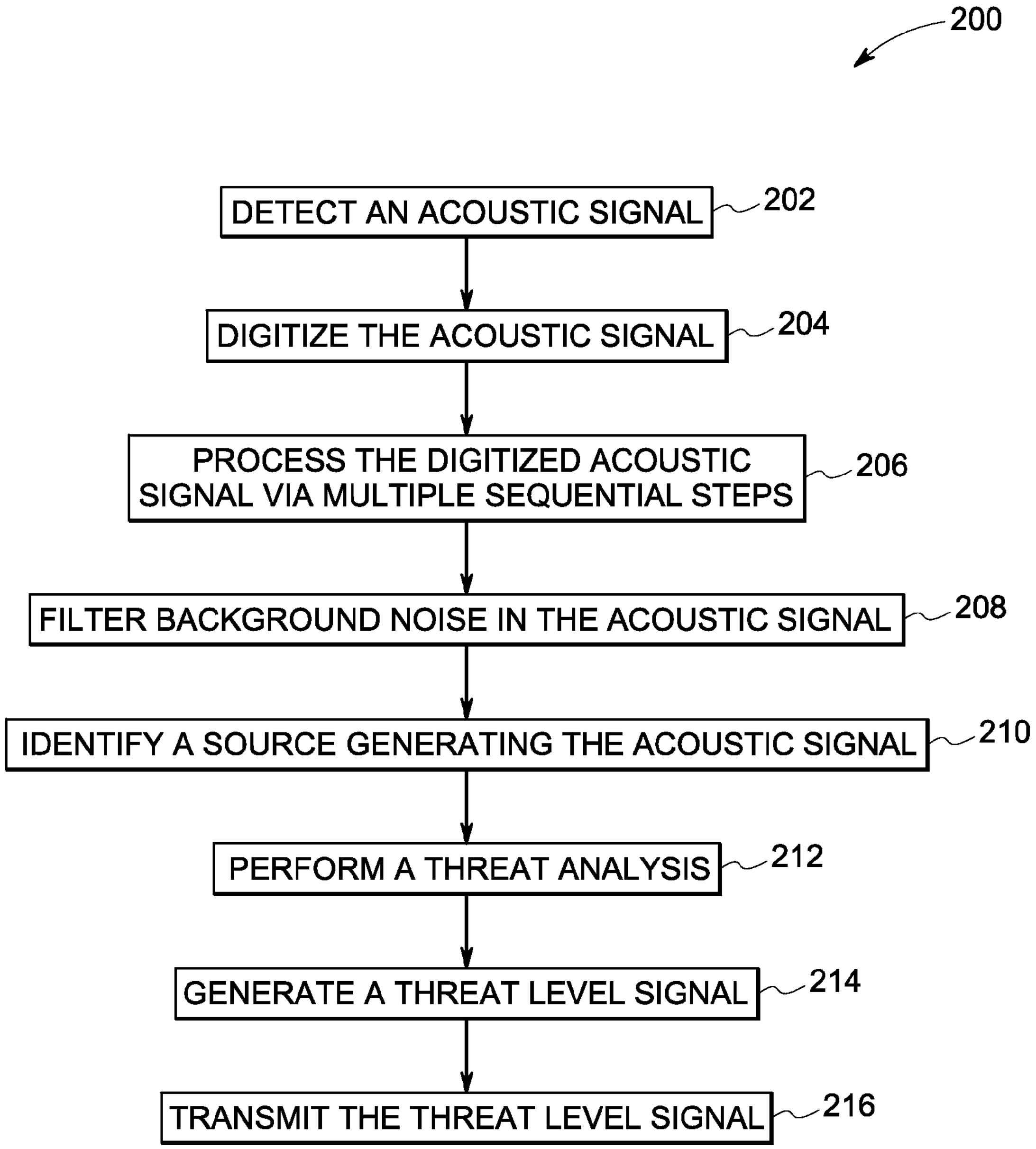
FIG. 7 is a flow chart representing steps in a method for generating a threat alert according to one embodiment of the invention.

FIG. 7 is a flow chart representing steps in an exemplary method 200 for generating a threat alert in an infrastructure component such as, but not limited to, a pipeline. The method 200 includes detecting an acoustic signal corresponding to an outcome that causes damage to the infrastructure component in step 202. The acoustic signal is digitized in step 204. The digitized acoustic signal is processed via multiple sequential steps in step 206. The sequential steps include filtering background noise in step 208. A source generating the acoustic signal is further identified in step 210. A threat analysis is performed in step 212 based upon identification of the source. In a particular embodiment, the acoustic signal is classified into dual categories such as threat signals and non-threat signals. A threat level signal is generated based upon the threat analysis in step 214. The threat level is transmitted to a concerned authority via a communication link in step 216. In a particular embodiment, the threat level is transmitted via a wireless means.

The various embodiments of a system and method for generating a threat alert described above thus provide a convenient and efficient means to prevent excavation damages from occurring. The technique provides a three-tier logic system that distinguishes acoustics of an excavation activity from background noise and acoustics of other types of non-excavation vehicles. The system and method also provide for cost effective hardware and easy deployment. Furthermore, direct human involvement is eliminated, while providing round the clock surveillance.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. For example, the use of an acoustic sensor with a satellite communication link with respect to one embodiment can be adapted for use with an excavation activity using a bulldozer in a protected zone. Similarly, the various features described, as well as other known equivalents for each feature, can be mixed and matched by one of ordinary skill in this art to construct additional systems and techniques in accordance with principles of this disclosure.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for generating a threat alert in an infrastructure component comprising:

a plurality of acoustic sensors disposed in a protected zone around the infrastructure component, wherein each of the plurality of sensors is configured to detect a signal corresponding to an outcome that causes damage to the infrastructure component;

a processing circuitry coupled to each of the plurality of acoustic sensors, the processing circuitry comprising:

at least one analog-to-digital converter configured to digitize the signal;

a digital signal processor configured to process the acoustic signal in a sequential routine, the routine comprising:

a noise filtering routine configured to filter background noise from the acoustic signal and generate a filtered signal, the noise filtering routine comprising:

a Wiener filter configured to compare the acoustic signal with a database of acoustic signals of a plurality of vehicles and output a Wiener filter error based upon comparison;

a spectral subtractor configured to compare the acoustic signal with a database of noise signals and output a spectral subtractor error; and a decision process module configured to output an estimated source signal to the source identification routine when a combination of the Wiener filter error and the spectral subtractor error is within an acceptable range.

a source identification routine configured to identify a source generating the acoustic signal based upon the filtered signal; and a threat analysis routine configured to detect a threat based upon the source identified and generate a threat level signal; and a remote monitoring center configured to receive the threat level signals from the processing circuitry and transmit an alert message to a concerned authority via a communication link.

2. The system of claim 1, wherein the communication link comprises satellite communication, a wireless sensor-to-sensor communication, hardwire computer data link or a cellular link.

3. The system of claim 1, wherein the background noise comprises traffic noise.

4. The system of claim 1, wherein the source identification routine is further configured to distinguish a source with a potential threat from other sources.

5. A method for generating a threat alert in an infrastructure component comprising:

detecting an acoustic signal corresponding to an outcome that causes damage to the infrastructure component;

digitizing the acoustic signal;

processing the digitized acoustic signal via a plurality of sequential steps, the sequential steps comprising:

filtering background noise in the acoustic signal comprising;

comparing the acoustic signal with a database of acoustic signals of a plurality of vehicles via a Wiener filter and outputting a Wiener filter error based upon comparison;

comparing the acoustic signal with a database of noise signals via a spectral subtractor and outputting a spectral subtractor error; and outputting an estimated source signal to the source identification routine via a decision process module if a combination of the Wiener filter error and the spectral subtractor error is within an acceptable range, identifying a source generating the acoustic signal based upon the filtering of the background noise;

performing a threat analysis based upon identification of the source; and generating a threat level signal based upon the threat analysis; and transmitting the threat level signal to a concerned authority via a communication link.

6. The method of claim 5, wherein filtering the background noise comprises filtering traffic noise.

7. The method of claim 5, wherein said performing the threat analysis comprises classifying the acoustic signal into dual categories.

8. The method of claim 7, wherein the dual categories comprise a first category of threat signals and a second category of non-threat signals.

9. The method of claim 5, wherein the transmitting comprises wireless transmission.

10. A digital signal processing sequential routine for generating threat alert in an infrastructure component comprising:

a noise filtering routine configured to filter background noise from an acoustic signal detected by an acoustic sensor and generate a filtered signal, the noise filtering routine comprising:

a Wiener filter configured to compare the acoustic signal with a database of acoustic signals of a plurality of vehicles and output a Wiener filter error based upon comparison;

a spectral subtractor configured to compare the acoustic signal with a database of noise signals and output a spectral subtractor error; and a decision process module configured to output an estimated source signal to the source identification routine when a combination of the Wiener filter error and the spectral subtractor error is within an acceptable range.

a source identification routine configured to identify a source generating the acoustic signal based upon the filtered signal; and a threat analysis routine configured to detect a threat and generate a threat level signal based upon the source identified.

* * * * *

UNITED STATES PATENT AND TRADEMARK OFFICE

CERTIFICATE OF CORRECTION

PATENT NO. : 8,050,143 B2
APPLICATION NO. : 12/054510
DATED : November 1, 2011
INVENTOR(S) : Bufi et al.

It is certified that error appears in the above-identified patent and that said Letters Patent is hereby corrected as shown below:

In Fig. 3, Sheet 2 of 5, delete "ESTIMATED VECHICLE SIGNAL" and insert -- ESTIMATED VEHICLE SIGNAL --, therefor.

In Column 4, Line 23, delete "Weiner" and insert -- Wiener --, therefor.

In Column 4, Line 25, delete "Weiner" and insert -- Wiener --, therefor.

In Column 4, Line 31, delete "Weiner" and insert -- Wiener --, therefor.

In Column 4, Line 32, delete "Weiner" and insert -- Wiener --, therefor.

In Column 6, Line 61, in Claim 1, delete "range." and insert -- range, --, therefor.

In Column 8, Line 31, in Claim 10, delete "range." and insert -- range, --, therefor.

Signed and Sealed this
Third Day of January, 2012

David J. Kappos

*Director of the United States Patent and Trademark Office*